US 12,066,662 B2

(12) United States Patent
Kuo et al.

(10) Patent No.: US 12,066,662 B2
(45) Date of Patent: Aug. 20, 2024

(54) APPARATUS FOR OPTICAL COUPLING AND SYSTEM FOR COMMUNICATION

(71) Applicant: Taiwan Semiconductor Manufacturing Company, Ltd., Hsinchu (TW)

(72) Inventors: Feng-Wei Kuo, Hsinchu County (TW); Wen-Shiang Liao, Miaoli County (TW); Robert Bogdan Staszewski, Dublin (IE); Jianglin Du, Hsinchu (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 0 days.

(21) Appl. No.: 18/334,386

(22) Filed: Jun. 14, 2023

(65) Prior Publication Data
US 2023/0324615 A1  Oct. 12, 2023

Related U.S. Application Data

(63) Continuation of application No. 17/069,879, filed on Oct. 14, 2020, now Pat. No. 11,719,885.

(51) Int. Cl.
*G02B 6/293* (2006.01)
*F21V 8/00* (2006.01)
*G02B 6/30* (2006.01)

(52) U.S. Cl.
CPC ....... *G02B 6/29325* (2013.01); *G02B 6/0083* (2013.01); *G02B 6/305* (2013.01)

(58) Field of Classification Search
CPC .......................... G02B 6/0083; G02B 6/29325
See application file for complete search history.

(56) References Cited

U.S. PATENT DOCUMENTS

| | | | | |
|---|---|---|---|---|
| 5,742,433 A | * | 4/1998 | Shiono | G02B 5/1876 359/574 |
| 7,260,293 B1 | * | 8/2007 | Gunn, III | G02B 6/124 385/37 |
| 7,680,371 B2 | | 3/2010 | Cheben et al. | |
| 9,632,248 B2 | | 4/2017 | Selvaraja | |
| 11,719,885 B2 | * | 8/2023 | Kuo | G02B 6/29325 385/37 |

(Continued)

FOREIGN PATENT DOCUMENTS

CN        101556356 A        10/2009

OTHER PUBLICATIONS

Nambiar et al., "Grating-Assisted Fiber to Chip Coupling for SOI Photonic Circuits", Appl. Sci. 2018, 8, 1142, published Jul. 13, 2018, 22 pages. (Year: 2018).

(Continued)

*Primary Examiner* — Daniel Petkovsek
(74) *Attorney, Agent, or Firm* — Eschweiler & Potashnik, LLC

(57) ABSTRACT

Disclosed are apparatuses for optical coupling and a system for communication. In one embodiment, an apparatus for optical coupling including a substrate and a grating coupler is disclosed. The grating coupler is disposed on the substrate and includes a plurality of coupling gratings arranged along a first direction, wherein effective refractive indices of the plurality of coupling gratings gradually decrease along the first direction.

20 Claims, 5 Drawing Sheets

(56) References Cited

U.S. PATENT DOCUMENTS

| | | |
|---|---|---|
| 2002/0176463 A1 | 11/2002 | Bullington et al. |
| 2004/0156589 A1 | 8/2004 | Gunn, III et al. |
| 2014/0193115 A1 | 7/2014 | Popovic |
| 2018/0074264 A1 | 3/2018 | Tokushima et al. |
| 2020/0003956 A1 | 1/2020 | Kuo et al. |
| 2020/0003970 A1 | 1/2020 | Marchetti et al. |
| 2021/0199971 A1 | 7/2021 | Lee et al. |

OTHER PUBLICATIONS

Non-Final Office Action dated Mar. 8, 2022 for U.S. Appl. No. 17/069,879.
Final Office Action dated Sep. 13, 2022 for U.S. Appl. No. 17/069,879.
Non-Final Office Action dated Dec. 20, 2022 for U.S. Appl. No. 17/069,879.
Notice of Allowance dated Mar. 29, 2023 for U.S. Appl. No. 17/069,879.

* cited by examiner

APPARATUS FOR OPTICAL COUPLING AND SYSTEM FOR COMMUNICATION

CROSS-REFERENCE TO RELATED APPLICATION

This is a continuation application of and claims the priority benefit of U.S. application Ser. No. 17/069,879, filed on Oct. 14, 2020, now issued as U.S. Pat. No. 11,719,885 B2. The entirety of the above-mentioned patent application is hereby incorporated by reference herein and made a part of this specification.

BACKGROUND

Optical gratings are frequently used to enable communication between light sources and other components (e.g., photodetectors). For example, optical gratings can be used to redirect light from an optical fiber into an optical detector. Light coupled from one end of the optical gratings that has been traveling transversely through the optical gratings by reflecting off the inner surfaces at shallow angles may be redirected so that it strikes the inner surfaces at a sharper angle that is greater than the critical angle of incidence, thus allowing the redirected light to escape from the other end of the optical gratings. After escaping, the light may impinge upon the optical detector. The detected light may then be used for various purposes, such as to receive an encoded communications signal that was transmitted through the optical gratings. Unfortunately, this process, as well as a reverse process in which optical gratings are used to redirect light from an on-chip light source to an optical fiber, may exhibit poor coupling efficiency, with a large part of the redirected light not reaching the optical detector. There exists a need to develop an apparatus and system of efficient optical coupling using optical gratings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
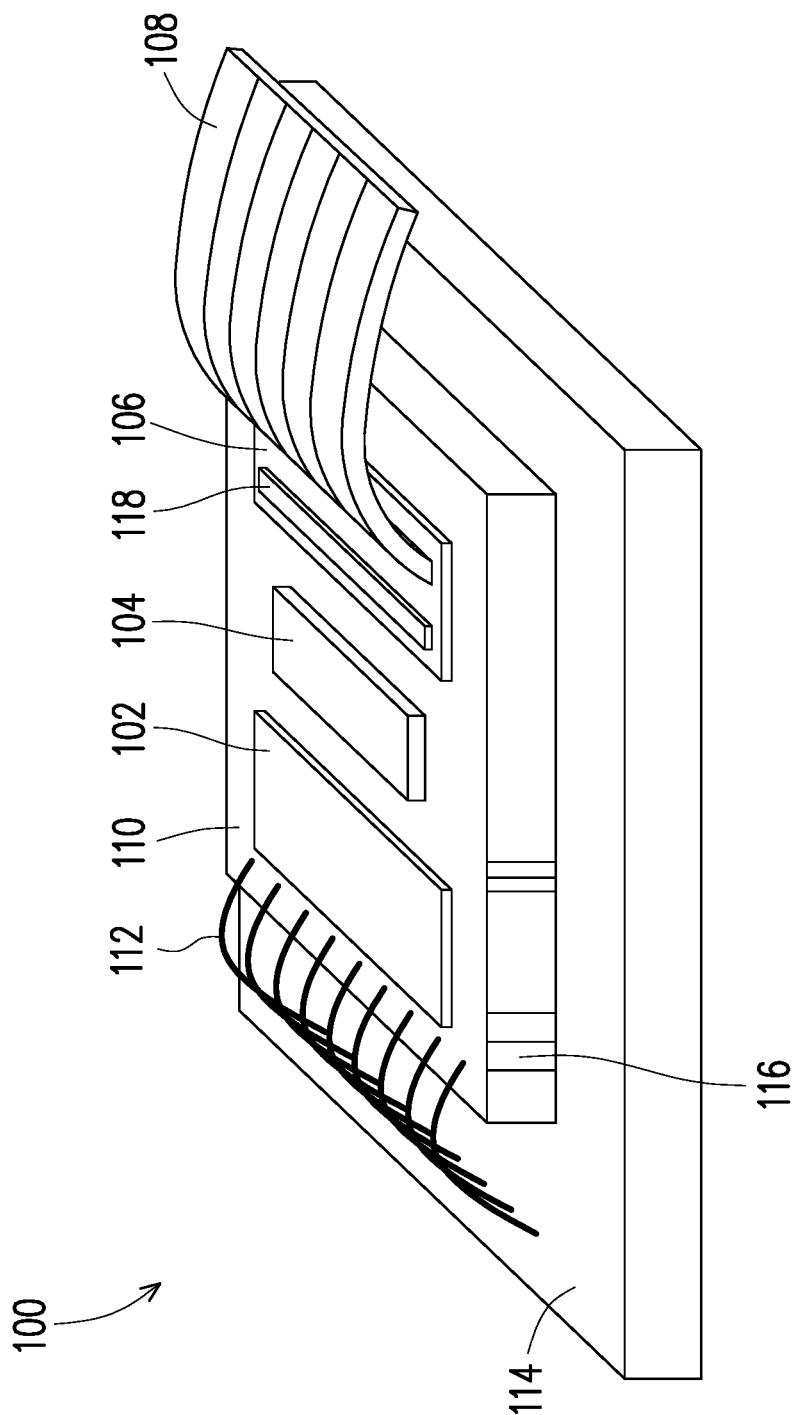
FIG. 1 illustrates an exemplary block diagram of an apparatus for optical coupling, in accordance with some embodiments of present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, it will be understood that when an element is referred to as being "connected to" or "coupled to" another element, it may be directly connected to or coupled to the other element, or one or more intervening elements may be present. Further, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The coupling efficiency is the ratio of power that couples from the waveguide mode to the fiber mode (or vice versa) and can be calculated using $CE=(1-R)*\eta_d*\eta_{ov}$, wherein $\eta_d$ is the directionality, $\eta_{ov}$ is the optical field overlap, and R is the back reflection. Directionality $\eta_d$ measures a fraction of power that are diffracted upward. The optical field overlap $\eta_{ov}$ measures the overlap integral between the diffracted field profile and the Gaussian fiber mode, and the back reflection R measures a fraction of power reflected back into the input port. Therefore, in order to improve the coupling efficiency, one can improve the directionality, increase the overlap and use small refractive index contrast to reduce the back reflection. This disclosure presents various embodiments of an efficient fiber-to-chip grating coupler with high coupling efficiency.

In one embodiment, a disclosed grating coupler includes a plurality of coupling gratings arranged along a first direction. Effective refractive indices of the plurality of coupling gratings gradually decrease along the first direction, which helps to reduce the back reflection, and thus reduces fiber light loss at the optical input/output (I/O) device and improves the coupling efficiency. In the embodiment, the plurality of coupling gratings may have multiple etch depths fabricated by multiple etch steps. Each of the plurality of coupling gratings may have the shape of an ascending step in the first direction, which helps to improve the directionality, and thus improves the coupling efficiency.

In addition, the height and angle of an optical fiber array coupled to the grating coupler may be adjusted to obtain a better grating coupling efficiency. Once an optimal or a desired input angle of the optical signals is determined, one can also design the structure of the grating coupler to ensure a good coupling efficiency. For example, metal layers above the core layer may be etched to form an optical channel that aligns with the optimal or desired input angle. This ensures that the optical signals received via the optical channel will have the optimal or desired input angle for the grating coupler to enjoy a good coupling efficiency.

The disclosed grating coupler has a high coupler efficiency and is easy to implement in any suited silicon photonics I/O and high speed applications. The disclosed grating coupler is convenient for wafer-scale testing as well as low-cost packaging. The disclosed grating coupler overcomes process variation with wavelength shift.

FIG. 1 illustrates an exemplary block diagram of an apparatus 100 for optical coupling, in accordance with some embodiments of present disclosure. It is noted that the apparatus 100 for optical coupling is merely an example, and is not intended to limit the present disclosure. Accordingly, it is understood that additional functional blocks may be provided in or coupled to the apparatus 100 for optical coupling of FIG. 1, and that some other functional blocks may only be briefly described herein.

Referring to FIG. 1, the apparatus 100 for optical coupling includes an electronic die 102, a light source die 104, a photonic die 106, an interposer (or a substrate) 110, and a printed circuit board (PCB) substrate 114. The electronic die 102, the light source die 104 and the photonic die 106 are coupled together through input/output interfaces (not shown) on the interposer 110. In some embodiments, the interposer 110 is fabricated using silicon. In some embodiments, the interposer 110 includes at least one of the following: interconnecting routing, through silicon via (TSV), and contact pads. In some embodiments, the interposer 110 is to integrate all components including the electronic die 102, the light source die 104, and the photonic die 106 together. In certain embodiments, each of the electronic die 102, the light source die 104, and the photonic die 106 are coupled to the interposer 110 using a flip-chip (controlled collapse chip connection, C4) interconnection method. In some embodiments, high density solder microbumps are used to couple the electronic die 102, the light source die 104, and the photonic die 106 to the interposer 110. Further, the interposer 110 is coupled to the PCB substrate 114 through wire bonding 112 or through silicon-vias (TSV) 116 using soldering balls. The TSVs 116 can include electrically conductive paths that extend vertically through the interposer 110 and provide electrical connection between the electronic die 102 and the PCB 114. In some embodiments, the PCB substrate 114 can include a support structure for the apparatus 100 for optical coupling, and can include both insulating and conductive materials for isolation devices as well as providing electrical contact for active devices on the photonic die 106 as well as circuits/devices on the electronic die 102 via the interposer 110. Further, the PCB substrate 114 can provide a thermally conductive path to carry away heat generated by devices and circuits in the electronic die 102 and the light source die 104.

In some embodiments, the electronic die 102 includes circuits (not shown) including amplifiers, control circuit, digital processing circuit, etc. The electronic die 102 further includes at least one electronic circuit (not shown) that provides the required electronic function of the apparatus 100 for optical coupling and driver circuits for controlling the light source die 104 or elements in the photonic die 106.

In some embodiments, the light source die 104 includes a plurality of components (not shown), such as at least one light emitting elements (e.g., a laser diode or a light-emitting diode), transmission elements, modulation elements, signal processing elements, switching circuits, amplifier, input/output coupler, and light sensing/detection circuits. In some embodiments, each of the at least one light-emitting elements in the light source die 104 can include solid-state inorganic, organic or a combination of inorganic/organic hybrid semiconducting materials to generate light. In some embodiments, the light source die 104 is on the photonic die 106.

In some embodiments, the photonic die 106 includes an optical fiber array 108, an optical interface, and a plurality of fiber-to-chip grating couplers 118. In some embodiments, the plurality of fiber-to-chip grating couplers 118 are configured to couple the light source die 104 and the optical fiber array 108. In some embodiments, the optical fiber array 108 includes a plurality of optical fibers and each of them can be a single-mode or a multi-mode optical fiber. In some embodiments, the optical fiber array 108 can be fixed on the photonic die 106 through adhesives (e.g., epoxy).

In some embodiments, the photonic die 106 further includes components (not shown) such as a laser driver, digital control circuit, photodetectors, waveguides, small form-factor pluggable (SFP) transceiver, high-speed phase modulator (HSPM), calibration circuit, distributed Mach-Zehnder interferometer (MZI), grating couplers, light sources, (i.e., laser), etc. Each of the plurality of fiber-to-chip grating coupler 118 enables the coupling of optical signals between the optical fiber array 108 and the light source die 104 or corresponding photodetectors on the photonic die 106. Each of the plurality of fiber-to-chip grating couplers 118 includes a plurality of gratings and a waveguide with designs to reduce refractive index contrast to reduce back reflection losses providing improved coupling efficiency between the optical fiber on the corresponding waveguide, which are discussed in details below in various embodiments of the present disclosure.

During operation, optical signals received from a remote server attached on one end of the optical fiber array 108 can be coupled through the fiber-to-chip grating couplers 118 attached to the other end of the optical fiber array 108 to the corresponding photodetectors on the photonic die 106. Alternatively, optical signals received from the light source die 104 can be coupled through the fiber-to-chip grating couplers 118 to the optical fiber array 108 which can be further transmitted to the remote server.

Figure 2:
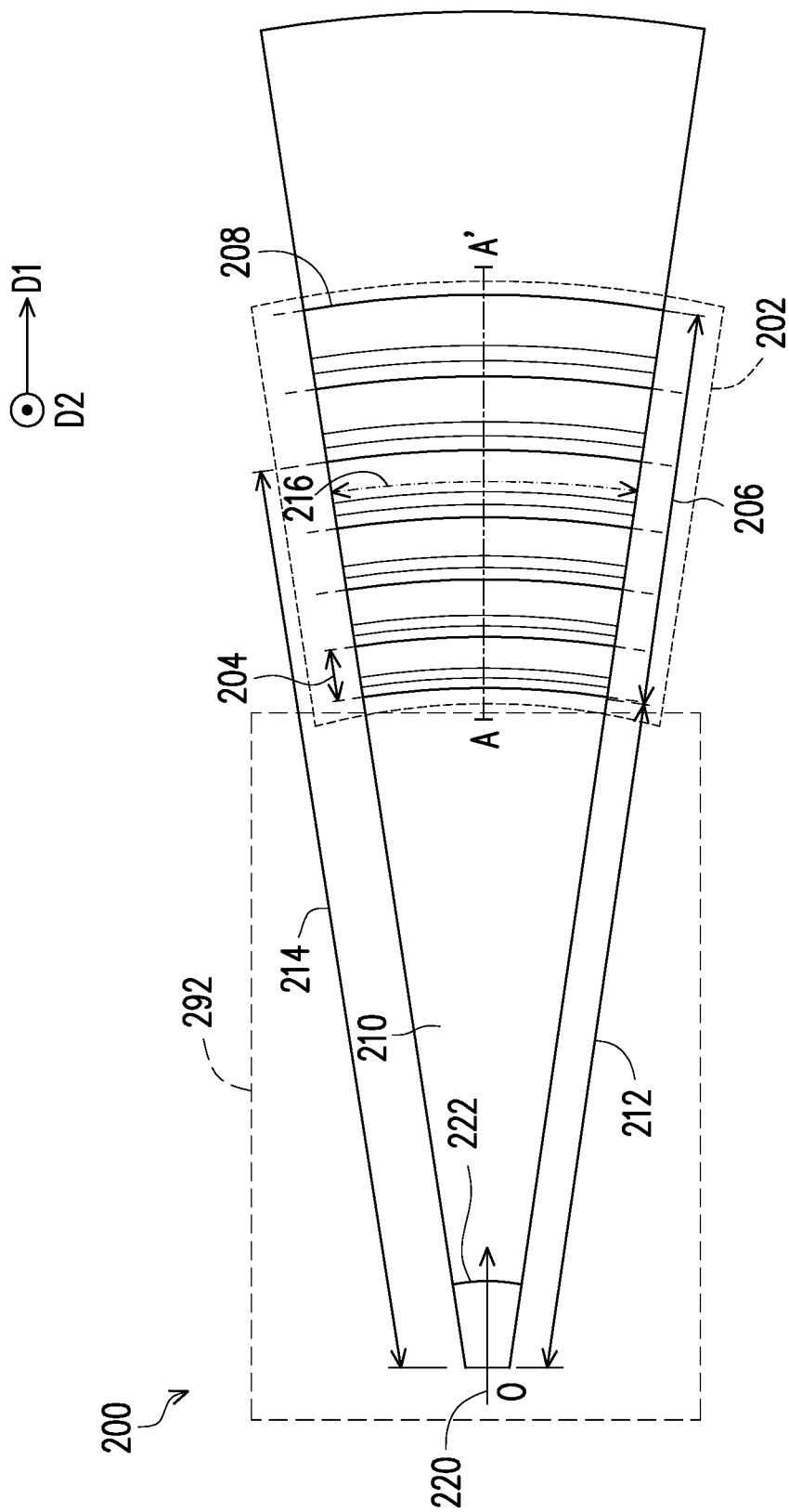
FIG. 2 illustrates a partial top view of an exemplary grating coupler, in accordance with some embodiments of the present disclosure.

FIG. 2 illustrates a partial top view of an exemplary grating coupler 200 (e.g., a fiber-to-chip grating coupler or a chip-to-fiber grating coupler), in accordance with some embodiments of the present disclosure. It is noted that the grating coupler 200 is merely an example, and is not intended to limit the present disclosure. Accordingly, it is understood that additional features (e.g., elements, layers, structures, or the like) may be provided in the grating coupler 200 of FIG. 2, and that some features may only be briefly described herein.

Referring to FIG. 2, the grating coupler 200 includes a grating region 202 and a waveguide 210. The grating region 202 includes a plurality of coupling gratings 204 arranged along a first direction D1 perpendicular to a thickness direction (e.g., a second direction D2) of the grating coupler 200. The waveguide 210 and the plurality of coupling gratings 204 are arranged along the first direction D1. For example, the plurality of coupling gratings 204 are arranged side by side along the first direction D1 by a side (e.g., the right side of the waveguide 210 in FIG. 2) of the waveguide 210, and the coupling grating 204 closest to the waveguide 210 is connected to the waveguide 210. In the illustrated embodiments, curved lines in the grating region 202 are edges 208 of the plurality of coupling gratings 204 in the grating coupler 200. Any numbers of edges 208 in each coupling grating 204 and any numbers of coupling gratings 204 in a grating coupler 200 can be used and are within the scope of the present disclosure.

In the illustrated embodiment, the grating coupler 200 scatters incident optical field 220 received from a waveguide 210 in a direction perpendicular to the plurality of coupling gratings 204 along the radius direction, the refractive index contrast between that of the waveguide 210 and the grating region 202 causes strong scattering out of the plurality of coupling gratings 204. The plurality of coupling gratings 204 in the grating region 202 produces an exponentially decaying intensity profile along the propagation direction along the radius direction at a given angle 222 relative to one end of the grating coupler 200. The exponentially decaying intensity profile may determine a position of an optical fiber (not shown) in the optical fiber array on top of the grating coupler 200 so as to efficiently couple the optical field from the chip to the optical fiber (or vice versa). In some embodiments, the number of coupling gratings 204 can be determined according to the shape, geometry and materials of the coupling gratings, as well as a desired operational wavelength range.

The grating region 202 and the waveguide 210 include a length 206 and a length 212 in the radius direction, respectively. In some embodiments, each of the plurality of coupling gratings 204 includes a radius of curvature 214 according to its position to the center O and an arc length 216. In some embodiments, each of the plurality of coupling gratings 204 in the grating coupler 200 does not have a curvature, i.e., the plurality of coupling gratings are straight and have the same length.

Figure 3:
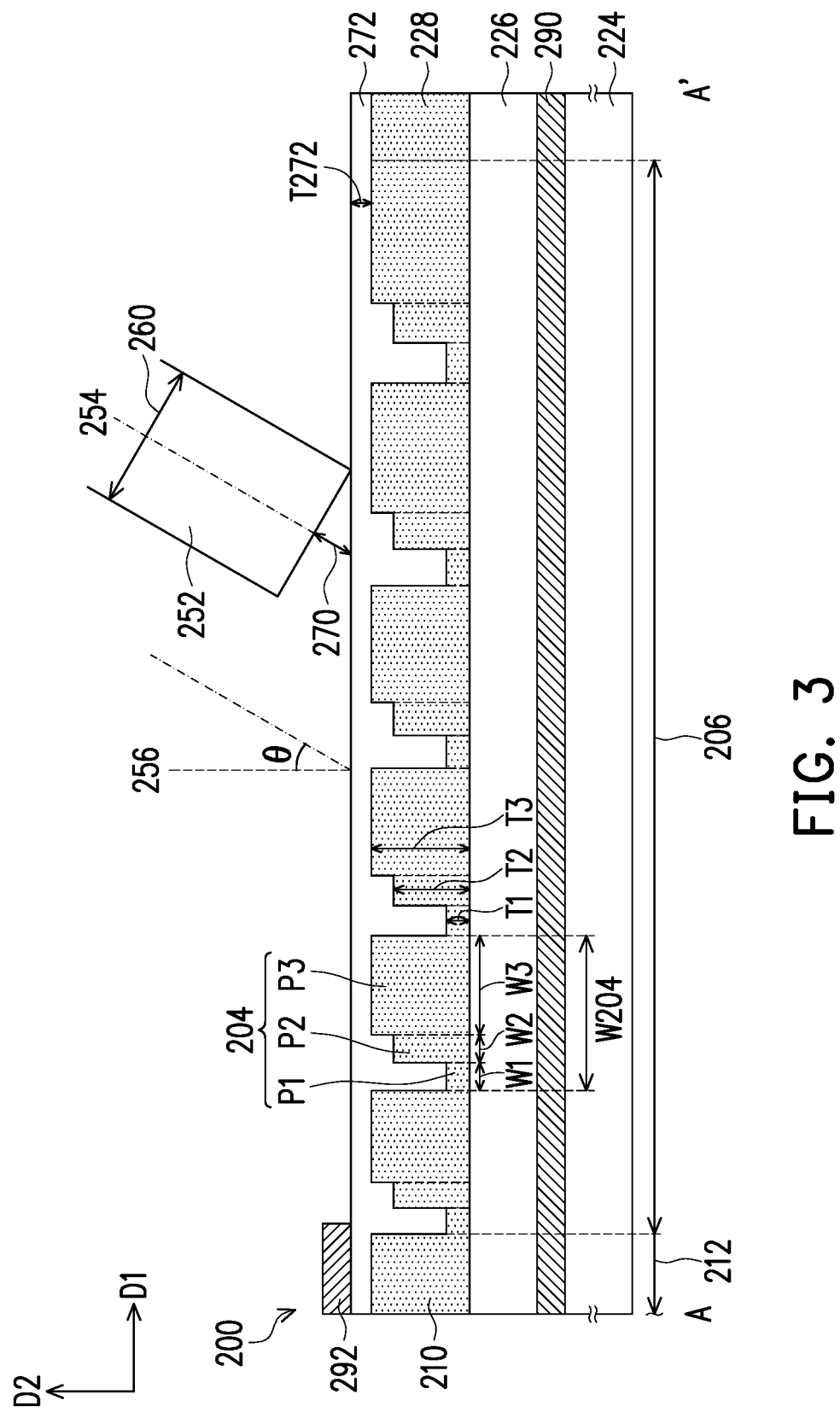
FIG. 3 illustrates a cross-sectional view of the grating coupler along line A-A' in FIG. 2.

FIG. 3 illustrates a cross-sectional view of the grating coupler 200 along line A-A' in FIG. 2. In the illustrated embodiments, the grating coupler 200 fabricated on a silicon substrate 224 includes a multi-layered structure including a bottom reflection layer 290, a silicon oxide layer 226, a silicon layer 228, a cladding layer 272, and a top reflection layer 292. It is noted that the multi-layered structure of the grating coupler 200 is merely an example, and is not intended to limit the present disclosure. Accordingly, it is understood that any numbers of layers in the grating coupler 200 can be used and are within the scope of the present disclosure.

In the illustrated embodiment, the silicon oxide layer 226 is fabricated on the silicon substrate 224 using chemical vapor deposition, physical vapor deposition, etc. In some embodiments, the silicon oxide layer 226 has a thickness of 2 μm. In some other embodiments, the thickness of the silicon oxide layer 226 is larger than 0 nm and less than or equal to 3 μm. In some embodiments, the silicon oxide layer 226 can be replaced by other types of dielectric materials, such as Si, Si3N4, SiO2 (e.g., quartz, and glass), Al2O3, and H2O, according to various embodiments of the present disclosure.

In some embodiments, the silicon layer 228 is deposited on the silicon oxide layer 226 using chemical vapor deposition. In some embodiments, the silicon layer 228 has a thickness of 270 nm. In some other embodiments, the silicon layer 228 has a thickness in a range of 200 nm to 500 nm (i.e., 200 nm≤thickness≤500 nm), according to various embodiments of the present disclosure.

In some embodiments, the material of the bottom reflection layer 290 includes at least one of the following: Al, Cu, Ni, and a combination. In some embodiments, the bottom reflection layer 290 has a thickness in a range of 0.1 μm to 10 μm. In some embodiments, the material of the top reflection layer 292 includes at least one of the following: Al, Cu, Ni and a combination. In some embodiments, the top reflection layer 292 has a thickness in a range of 0.1 μm to 10 μm. In some embodiments, the top reflection layer 292 only covers the waveguide 210. In some embodiments, an area of the top reflection layer 292 is equal to or greater than 20×20 microns.

In some embodiments, the material of the cladding layer 272 includes silicon oxide. In some embodiments, the cladding layer 272 has a thickness T272 of 2 μm. In some embodiments, the thickness T272 of the cladding layer 272 is in a range of 0.6 μm to 3 μm, according to various applications. In some embodiments, the cladding layer 272 can include other types of dielectric materials according to different applications, including polycrystalline silicon and silicon nitride. In some other embodiments, the cladding layer 272 includes a plurality of layers with graded indices (i.e., the refractive index of the layers in the cladding layer 272 increases). In some embodiments, the thickness of the plurality of layers can be individually adjusted according to various applications. It should be noted that this is merely an example and optimized thickness of the cladding layer 272 is a function of its effective index (i.e., material properties) in combination with the grading structure underneath. Therefore, any thickness of the cladding layer 272 can be used to achieve optimized coupling efficiency at desired wavelengths and are within the scope of the present disclosure.

In some embodiments, at least one of the cladding layer 272, the bottom reflection layer 290, and the top reflection layer 292 can be omitted. In some embodiments, the grating coupler 200 may further include a package layer (not shown) that covers the cladding layer 272, but not limited thereto.

In some embodiments, the waveguide 210 includes the same material used in the plurality of coupling gratings 204. In some other embodiments, the waveguides 210 includes a second material that is different from the material used in the plurality of coupling gratings 204.

In the illustrated embodiments, each of the plurality of coupling gratings 204 has the shape of an ascending step in the first direction D1 for achieving a low back-reflection and a high directionality. Specifically, each of the plurality of coupling gratings 204 includes a plurality of portions (e.g., a first portion P1, a second portion P2, and a third portion P3) extend along the arc length 216 (see FIG. 2) direction and arranged along the first direction D1, and thicknesses of the plurality of portions increase along the first direction D1. As shown in FIG. 3, the thickness T2 of the second portion P2 is larger than the thickness T1 of the first portion P1, and the thickness T3 of the third portion P3 is larger than the thickness T2 of the second portion P2. Moreover, in any two adjacent coupling gratings 204 in the first direction D1, the third portion P3 of one coupling grating 204 is connected to the first portion P1 of the other coupling grating 204.

In the illustrated embodiments, the thickness of each of the plurality of portions is constant. Namely, each portion has a single thickness instead of a plurality of thicknesses. In some embodiments, the thickness T1 of the first portion P1 is larger than or equal to 0 nm and less than or equal to 210 nm. The cladding layer 272 contacts the silicon oxide layer 226 when the thickness T1 of the first portion P1 is equal to 0 nm. In some embodiments, the thickness T2 of the second portion P2 is larger than or equal to 70 nm and less than or equal to 270 nm. In some embodiments, the thickness T3 of the third portion P3 is larger than or equal to 200 nm and less than or equal to 500 nm.

In some embodiments, the first portions P1 of the plurality of coupling gratings 204 have the same thickness, the second portions P2 of the plurality of coupling gratings 204 have the same thickness, and the third portions P3 of the plurality of coupling gratings have the same thickness. In this way, the plurality of coupling gratings 204 can be formed from the silicon layer 228 through double etching steps. For example, shallow trenches are formed on left sides of the third portions P3 in the silicon layer 228 by an etching step; and deep or full trenches are formed between two adjacent coupling gratings 204 in the silicon layer 228 by another etching step. However, any numbers of portions in each coupling grating 204 and any numbers of etching steps can be used and are within the scope of the present disclosure.

In the illustrated embodiments, widths W204 of the plurality of coupling gratings 204 in the first direction D1 gradually increase along the first direction D1. Specifically, in each of the plurality of coupling gratings 204, the first portion P1 has a width W1 in the first direction D1, the second portion P2 has a width W2 in the first direction D1, and the third portion P3 has a width W3 in the first direction D1. In some embodiments, the width W1 of the first portion P1 of each of the plurality of coupling gratings 204 in the first direction D1 is larger than 0 nm and less than or equal to 200 nm. In some embodiments, the width W2 of the second portion P2 of each of the plurality of coupling gratings 204 in the first direction D1 is larger than 0 nm and less than or equal to 300 nm. In some embodiments, the width W3 of the third portion P3 of each of the plurality of coupling gratings 204 in the first direction D1 is larger than 170 nm and less than or equal to 370 nm.

In some embodiments, widths W1 of the first portions P1 of the plurality of coupling gratings 204 in the first direction D1 gradually increase along the first direction D1, widths W2 of the second portions P2 of the plurality of coupling gratings 204 in the first direction D1 gradually increase along the first direction D1, and widths W3 of the third portions P3 of the plurality of coupling gratings 204 in the first direction D1 gradually increase along the first direction D1, so that widths W204 of the plurality of coupling gratings 204 in the first direction D1 gradually increase along the first direction D1. In some embodiments, the variations (or increase amounts) in widths W1, widths W2, and widths W3 in the first direction D1 may be the same or different. As the widths W1 and the widths W2 increase along the first direction D1, the etching width/area along the first direction D1 becomes larger. In some embodiments, effective refractive indices of the plurality of coupling gratings 204 gradually decrease along the first direction D1.

In the illustrated embodiments, high coupling efficiency (e.g., a coupling efficiency greater than 80% or even greater than 85%) can be obtained by designing widths and thicknesses of the portions of each coupling grating 204. For example, the thicknesses T1 are larger than 0 nm, the thicknesses T2 are larger than 210 nm, the thicknesses T3 are larger than 270 nm, the widths W1 are larger than 60 nm, the widths W2 are larger than 230 nm, and the widths W3 are larger than 270 nm, according to various embodiments of the present disclosure. For near infrared wavelength (e.g., wavelength of 1310 nm) application, the widths W204 (total width of the coupling grating 204) are larger than or equal to 300 nm and less than or equal to 800 nm.

In some embodiments, the radiated optical field 270 from the grating coupler 200 is collected by an optical fiber 252 with a core diameter 260. In some alternative embodiments, the radiated optical field 270 from the optical fiber 252 is collected by the grating coupler 200. The shape of the ascending step in the first direction D1 of each of the plurality of coupling gratings 204 helps to improve the directionality (e.g., helps to direct the optical field 270 from the optical fiber 252 to the waveguide 210), and thus improves the coupling efficiency of the grating coupler 200.

In one example, the fiber core diameter 260 is less than 10 μm. In some embodiments, the optical fiber 252 receives the optical field 270 at a non-zero angle θ (an angle between an axis 254 of the optical fiber 252 and a direction 256 perpendicular to the substrate 224). In some embodiments, the non-zero angle θ is 12 degrees. In some other embodiments, the non-zero angle θ of the optical fiber 252 can be larger than or equal to 5 degrees and smaller than or equal to 15 degrees, according to the structural/geometric/materials properties of the grating coupler 200 and the cladding layer 272. In some embodiments, the optical fiber 252 can be a single mode fiber or a multimode fiber.

Figure 4:
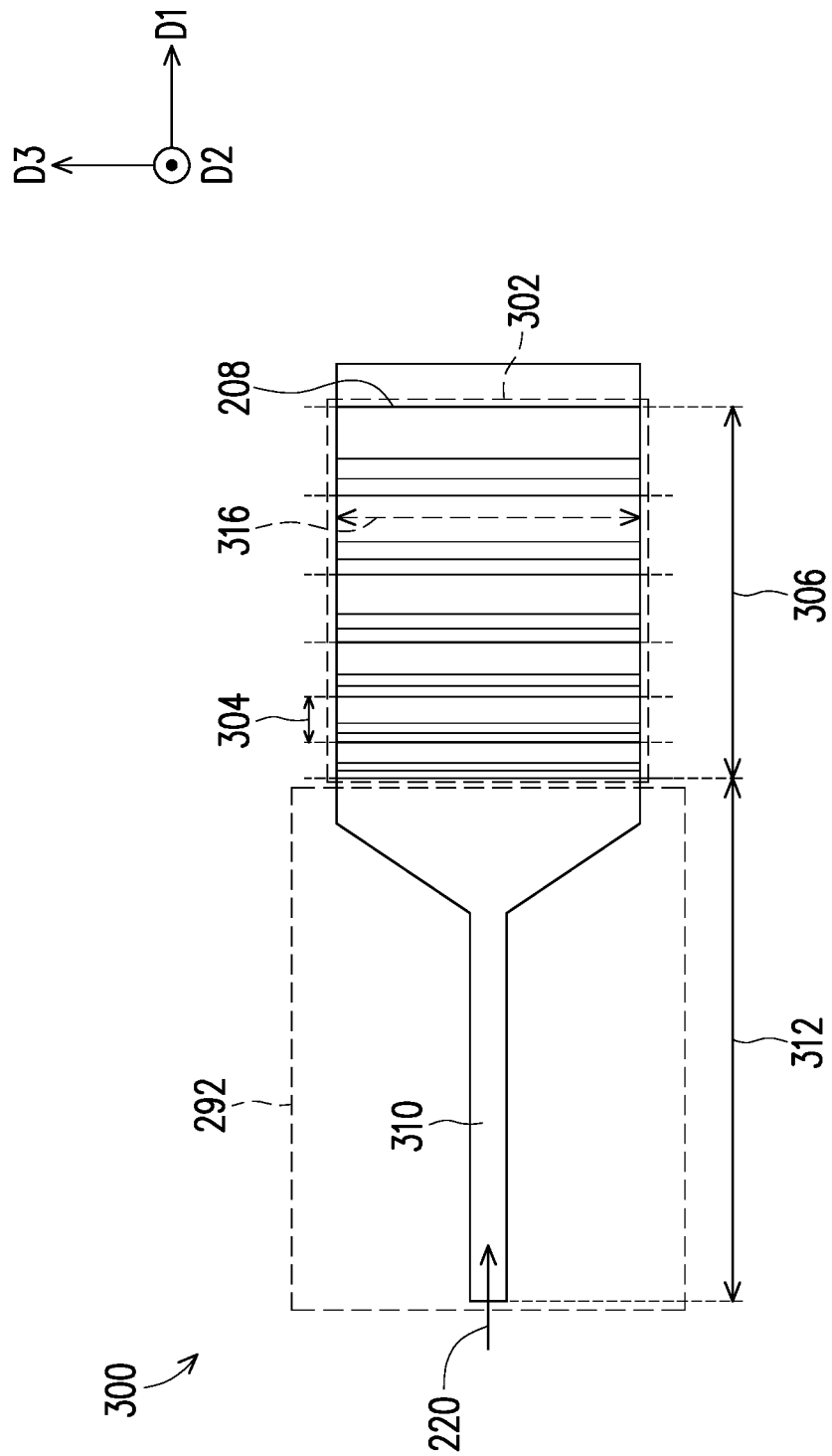
FIG. 4 illustrates a schematic view of another exemplary grating coupler, in accordance with some embodiments of the present disclosure.

FIG. 4 illustrates a schematic view of another exemplary grating coupler 300, in accordance with some embodiments of the present disclosure. Referring to FIG. 4, the grating coupler 300 includes a grating region 302 and the waveguide 310. The grating region 302 includes a plurality of coupling gratings 304 arranged along the first direction D1 perpendicular to a thickness direction (e.g., the second direction D2) of the grating coupler 300. The design of the plurality of coupling gratings 304 may be referred to the plurality of coupling gratings 204 in FIG. 3, and thus is not repeated herein.

The main difference between the plurality of coupling gratings 304 and the plurality of coupling gratings 204 is that the plurality of coupling gratings 304 extend along a third direction D3 perpendicular to the first direction D1 and the second direction D2. Specifically, each of the plurality of coupling gratings 304 in the grating coupler 300 does not have a curvature, i.e., the plurality of coupling gratings 304 are straight and have the same length 316 in the second direction D2. Moreover, the grating region 302 and the waveguide 310 include a length 306 and a length 312 in the first direction D1, respectively.

Figure 5:
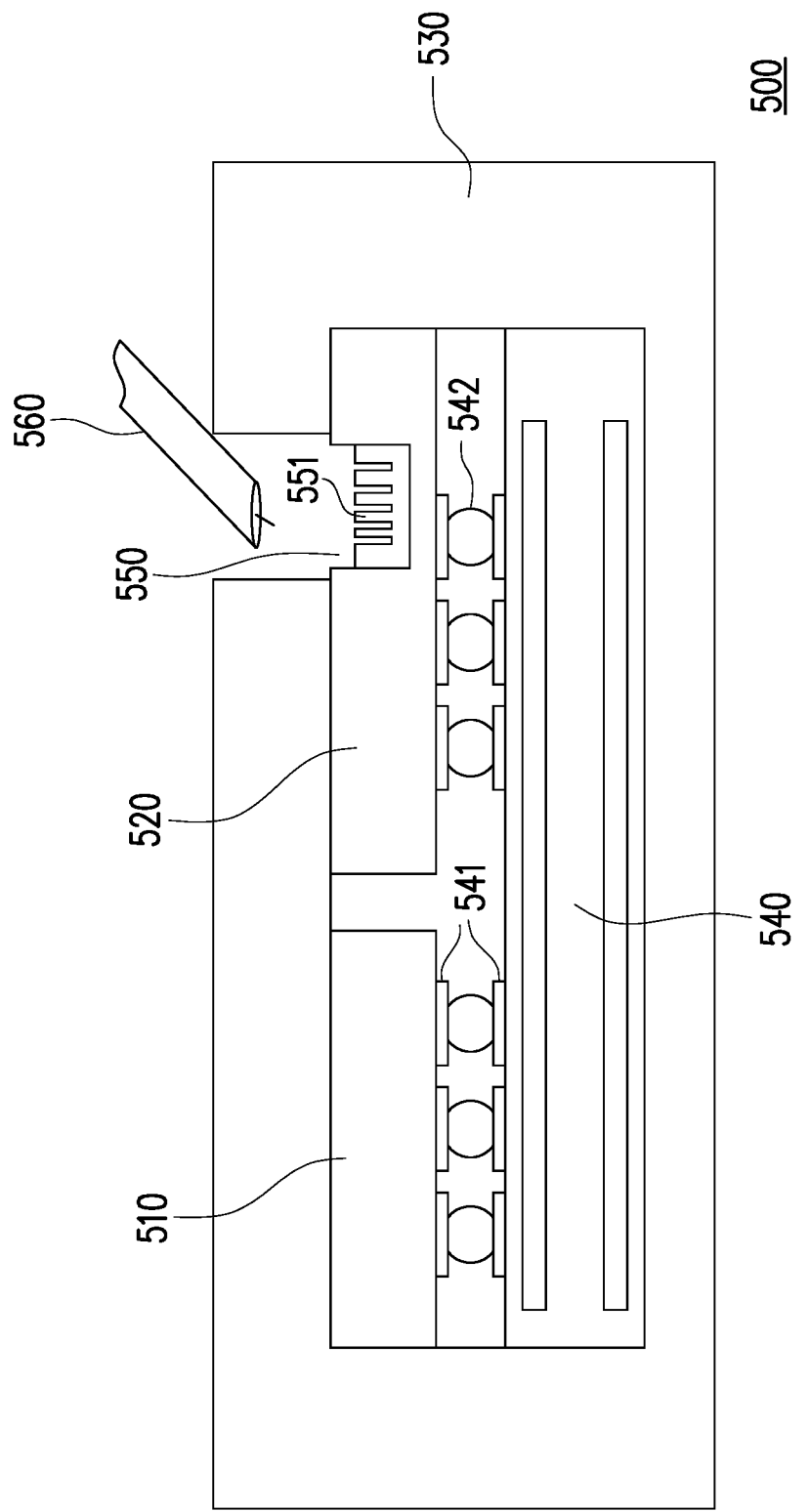
FIG. 5 illustrates a cross-sectional view of a system for communication, in accordance with some embodiments of the present disclosure.

FIG. 5 illustrates a cross-sectional view of a system for communication, in accordance with some embodiments of the present disclosure. Referring to FIG. 7, the system for communication is, for example, located inside an optical device 500. The system for communication includes an electronic die 510 and a photonic die (e.g., a semiconductor photonic die) 520 that are connected via an interposer (also referred to as "substrate") 540, through bumps 542 and pads 541. The electronic die 510, the photonic die 520 and the interposer 540 are covered by package material 530 which has an opening on top of a trench 550 of the photonic die 520. The system for communication further includes a grating coupler 551 located in the trench 550 for transmitting optical signals between the photonic die 520 and an optical fiber array 560 attached to the photonic die 520. The grating coupler 551 here serves as an optical input/output (I/O) device for the optical device 500.

According to some embodiments, the grating coupler 551 is configured for receiving optical signals from the optical fiber array 560 at an angle that is measured between an axis of the optical fiber array 560 and a direction perpendicular to the interposer 540. According to various embodiments, the angle of the optical fiber array 560 is adjustable between 5 and 15 degrees. The fiber angle may be modified to improve coupler efficiency of the grating coupler 551. The design of the grating coupler 551 may refer to the embodiments described above, and will not be repeated here. In some embodiments, the grating coupler design described above helps to enhance the coupling efficiency up to more than 80% for optical signal having wavelength around 1310 nm.

Based on the above discussions, it can be seen that the present disclosure offers various advantages. It is understood, however, that not all advantages are necessarily discussed herein, and other embodiments may offer different advantages, and that no particular advantage is required for all embodiments.

In accordance with some embodiments of the disclosure, an apparatus for optical coupling includes a substrate and a grating coupler. The grating coupler is disposed on the substrate and includes a plurality of coupling gratings arranged along a first direction. Effective refractive indices of the plurality of coupling gratings gradually decrease along the first direction.

In accordance with some embodiments of the disclosure, an apparatus for optical coupling includes a substrate and a grating coupler. The grating coupler is disposed on the substrate and includes a waveguide and a plurality of coupling gratings arranged along a first direction. Widths of the plurality of coupling gratings in the first direction gradually increase along the first direction.

In accordance with some embodiments of the disclosure, a system for communication includes a semiconductor photonic die on a substrate, an optical fiber array attached to the semiconductor photonic die, and at least one grating coupler. The semiconductor photonic die includes at least one trench. The at least one grating coupler is in the at least one trench for transmitting optical signals between the semiconductor photonic die and the optical fiber array. The at least one grating coupler includes a plurality of coupling gratings arranged along a first direction. Widths of the plurality of coupling gratings in the first direction gradually increase along the first direction. A non-zero angle is formed between an axis of the optical fiber array and a direction perpendicular to the substrate.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A grating coupler, comprising:
a substrate; and
a plurality of coupling gratings arranged over the substrate along a first direction and having a plurality of lengths, respectively, in the first direction,
wherein each of the plurality of coupling gratings comprises a first portion having a first width in the first direction and a first thickness in a second direction that is perpendicular to the first direction and that is perpendicular to an upper surface of the substrate, a second portion having a second width in the first direction and a second thickness in the second direction, and a third portion having a third width in the first direction and a third thickness in the second direction, the third thickness is greater than the second thickness, and the second thickness is greater than the first thickness, and each of the first widths, the second widths, and the third widths increase in the first direction for each of the plurality of coupling gratings and such that the plurality of lengths, respectively, increase in the first direction.

2. The grating coupler as claimed in claim 1, wherein the first thickness is larger than 0 nm and less than or equal to 210 nm.

3. The grating coupler as claimed in claim 1, wherein the second thickness is larger than or equal to 70 nm and less than or equal to 270 nm.

4. The grating coupler as claimed in claim 1, wherein the third thickness is larger than or equal to 200 nm and less than or equal to 500 nm.

5. The grating coupler as claimed in claim 1, wherein a total width of the first width, the second width and the third width is larger than or equal to 300 nm and less than or equal to 800 nm.

6. The grating coupler of claim 1, further comprising:
a cladding layer disposed on the plurality of coupling gratings and having a refractive index smaller than that of the plurality of coupling gratings.

7. The grating coupler of claim 1, wherein each of the plurality of coupling gratings have a planar surface extending in a third direction perpendicular to the first direction and perpendicular to the second direction.

8. The grating coupler of claim 1, wherein each of the plurality of coupling gratings are generally prism-shaped and have a planar surface extending in a third direction perpendicular to the first direction and perpendicular to the second direction.

9. The grating coupler of claim 8, wherein each of the plurality of coupling gratings that are generally prism-shaped are rectangular when viewed from above.

10. A grating coupler, comprising:
a substrate; and
a plurality of coupling gratings arranged over the substrate along a first direction and having a plurality of lengths, respectively, in the first direction,
wherein each of the plurality of coupling gratings comprises a first portion having a first width in the first direction and a first thickness in a second direction that is perpendicular to the first direction and that is perpendicular to an upper surface of the substrate, a second portion having a second width in the first direction and a second thickness in the second direction, and a third portion having a third width in the first direction and a third thickness in the second direction, the first through third thicknesses are different from each other, and each of the first widths, the second widths, and the third widths increase in the first direction for each of the plurality of coupling gratings and such that the plurality of lengths, respectively, increase in the first direction.

11. The grating coupler as claimed in claim 10, wherein the first thickness is larger than 0 nm and less than or equal to 210 nm.

12. The grating coupler as claimed in claim 10, wherein the second thickness is larger than or equal to 70 nm and less than or equal to 270 nm.

13. The grating coupler as claimed in claim 10, wherein the third thickness is larger than or equal to 200 nm and less than or equal to 500 nm.

14. The grating coupler as claimed in claim 10, wherein a total width of the first width, the second width and the third width is larger than or equal to 300 nm and less than or equal to 800 nm.

15. A method, comprising:
forming a silicon layer over a substrate; and
forming a plurality of coupling gratings from the silicon layer arranged along a first direction and having a plurality of lengths, respectively, in the first direction,
wherein each of the plurality of coupling gratings comprises a first portion having a first width in the first direction and a first thickness in a second direction that is perpendicular to the first direction and that is perpendicular to an upper surface of the substrate, a second portion having a second width in the first direction and a second thickness in the second direction, and a third portion having a third width in the first direction and a third thickness the second direction, the third thickness is greater than the second thickness that is greater than the first thickness, and each of the first widths, the second widths, and the third widths increase in the first direction for each of the plurality of coupling gratings and such that the plurality of lengths, respectively, increase in the first direction.

16. The method as claimed in claim 15, further comprising:
coupling an optical fiber array to the plurality of coupling gratings, wherein a non-zero angle is formed between an axis of the optical fiber array and the second direction.

17. The method as claimed in claim 16, wherein the non-zero angle is larger than or equal to 5 degrees and smaller than or equal to 15 degrees.

18. The method as claimed in claim 15, further comprising:
forming a cladding layer on the plurality of coupling gratings and having a refractive index smaller than that of the plurality of coupling gratings.

19. The method as claimed in claim 15, wherein the plurality of coupling gratings are formed from the silicon layer through double etching steps.

20. The method as claimed in claim 15, wherein the first thickness is larger than 0 nm and less than or equal to 210 nm, the second thickness is larger than or equal to 70 nm and less than or equal to 270 nm, and the third thickness is larger than or equal to 200 nm and less than or equal to 500 nm.

* * * * *